Nov. 4, 1930.                E. L. HOUGH                1,780,676
                            CONTROL SYSTEM
                         Filed Jan. 14, 1927
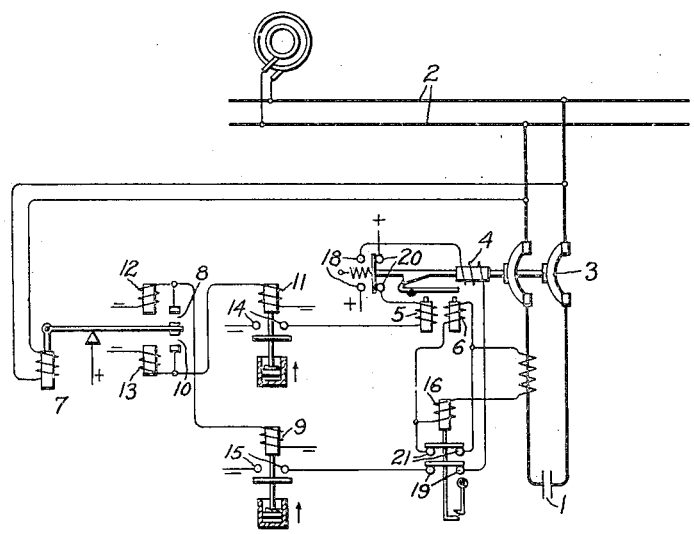
Inventor:
Eugene L. Hough,
by
  His Attorney.

Patented Nov. 4, 1930

1,780,676

UNITED STATES PATENT OFFICE

EUGENE L. HOUGH, OF ST. LOUIS, MISSOURI, ASSIGNOR TO GENERAL ELECTRIC COMPANY, A CORPORATION OF NEW YORK

CONTROL SYSTEM

Application filed January 14, 1927. Serial No. 161,195.

My invention relates to control systems, and particularly to a system for controlling the connection of a capacitor to an electric circuit and its object is to provide an automatic control arrangement for controlling the connections between an alternating current circuit and a capacitor in response to predetermined electrical conditions of the circuit.

In systems of alternating current distribution which supply inductive loads, the power factor and voltage of the system can be materially improved by connecting a capacitor of the proper size to the system so that the leading current taken by the capacitor compensates for the lagging current of the load. In accordance with my invention, I provide an arrangement whereby the capacitor is automatically connected across the circuit and is automatically disconnected from the circuit in response to predetermined electrical conditions of the system, such for example, as predetermined voltages or power factors.

My invention will be better understood from the following description, taken in connection with the accompanying drawing, and its scope will be pointed out in the appended claims.

Referring to the accompanying drawing, which diagrammatically shows an arrangement embodying my invention, 1 represents a capacitor which is adapted to be connected to an alternating current circuit 2 by means of a circuit breaker 3 which may be of any suitable type, examples of which are well known in the art. As shown, the circuit breaker 3 is of the well known latched-in type, and is provided with a closing coil 4, a voltage tripping coil 5 and a current tripping coil 6.

For controlling the closing and opening of the circuit breaker automatically in response to a predetermined electrical condition of the circuit 2, which in the particular arrangement shown is the voltage of the circuit 2, I have provided a contact making voltmeter 7. This voltmeter is arranged to effect the closing of the circuit breaker 3 when the voltage across the circuit 2 remains below a predetermined value for a predetermined length of time, and is arranged to effect the opening of the circuit breaker 3 when the voltage across the circuit 2 remains above a predetermined value for a predetermined length of time. As shown, the contact making voltmeter closes its contacts 8 and thereby completes the circuit of a time relay 9, when the voltage across the circuit 2 is less than a predetermined voltage, and closes its contacts 10 and thereby completes the circuit of a time relay 11, when the voltage across the circuit 2 is above a predetermined value.

The contact making voltmeter 7 may be provided with suitable holding coils 12 and 13 to prevent sparking at the contacts 8 and 10.

The time relays 9 and 11 are arranged in any suitable manner so that they close their contacts 14 and 15 respectively after their respective coils have been energized for a certain length of time. The closing of the contacts 14 completes a circuit for the voltage tripping coil 5 if the circuit breaker 3 is closed and the closing of the contacts 15 completes a circuit for the closing coil 4 if the circuit breaker is open.

In order to disconnect the capacitor 1 from across the circuit 2 in case a fault occurs in the capacitor, a lockout relay 16 is provided which is arranged to be energized in response to the current flowing through the capacitor. The relay 16 is arranged to be operated to effect the energization of the current tripping coil 6 and the interruption of the circuit of the closing coil 4 when the current through the capacitor exceeds a predetermined value. The relay 16 is arranged in any suitable manner, examples of which are well known in the art, so that it is held in its energized position, after its coil is deenergized, until it is reset manually.

The operation of the arrangement shown is as follows: When the voltage across the circuit 2 decreases below a predetermined value, the voltmeter 7 closes its contacts 8, thereby completing the circuits of the holding coil 12 and the time relay 9. After a predetermined time, relay 9 closes its contacts 15 so that a circuit for the closing coil 4 is completed from one side of a suitable control source, through auxiliary contacts 18 on circuit breaker 3, closing coil 4, contacts 19 of relay 16, contacts 15 of time relay 9 to the other side of the control circuit. The closing of the circuit breaker 3 connects the capacitor 1 across the circuit 2.

When the voltage across the circuit 2 increases above a predetermined value, the voltmeter 7 closes its contacts 10, thereby completing the circuit of the holding coil 13 and the time relay 11. After a predetermined time, relay 11 closes its contacts 14, thereby completing a circuit for the tripping coil 5 to effect the opening of the circuit breaker 3.

This circuit is from one side of a control circuit, through auxiliary contacts 20 on the circuit breaker 3, tripping coil 5, contacts 14 of time relay 11 to the other side of the control circuit.

If a fault develops in the capacitor 1 so that an excessive current is supplied thereto when the circuit breaker is closed, the lock-out relay 16 operates to open its contacts 19 in the closing coil circuit and its contacts 21, which normally complete a circuit around the current tripping coil 6. The opening of the contacts 21 effects the energization of the current tripping coil 6 so that the circuit breaker 3 is opened. Since the lock-out relay 16 remains in its energized position after its coil is deenergized due to the opening of the circuit breaker 3, further reclosing of the circuit breaker 3 is prevented until the relay 16 is reset by hand.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, an electric circuit, a capacitor, a switch for connecting said capacitor to said circuit, means responsive to an electrical condition of said electric circuit for controlling the closing of said switch, and means responsive to a predetermined current through said capacitor for effecting the opening of said switch and for rendering said control means inoperative to effect the closing of said switch.

2. In combination, an electric circuit, a capacitor, a switch for connecting said capacitor to said circuit, means responsive to the voltage of said circuit for controlling the closing of said switch, and means responsive to a predetermined current through said capacitor for effecting the opening of said switch and for removing the control of the closing of said switch from said voltage responsive means.

In witness whereof, I have hereunto set my hand this eleventh day of January, 1927.

EUGENE L. HOUGH.